United States Patent [19]

Currie et al.

[11] Patent Number: 4,634,090

[45] Date of Patent: Jan. 6, 1987

[54] COLLAPSIBLE SUPPORT STAND FOR AN ELECTRONIC MUSICAL KEYBOARD AND THE LIKE

[76] Inventors: Edmund Currie, 3905 N. Panama Ave., Chicago, Ill. 60634; Hillel Frankel, P.O. Box 3017, Santa Monica Blvd. #109, Santa Monica, Calif. 90406

[21] Appl. No.: 731,675

[22] Filed: May 7, 1985

[51] Int. Cl.⁴ ............................................. F16M 13/00
[52] U.S. Cl. .................................. 248/544; 248/415; 248/165; 108/157
[58] Field of Search ............... 248/544, 458, 460, 461, 248/159, 415, 499, 505, 165, 150, 151; 297/17; 108/150, 157, 34, 38

[56] References Cited

U.S. PATENT DOCUMENTS

| | | | |
|---|---|---|---|
| 423,259 | 3/1890 | Keller | 248/165 |
| 1,218,357 | 3/1917 | Bauer | 248/165 |
| 2,919,946 | 1/1960 | Miener | 248/499 |
| 3,313,511 | 4/1967 | Koerner | 248/505 |
| 3,391,660 | 7/1968 | Stewart | 108/150 |
| 3,420,481 | 1/1969 | Arnes | 248/505 |
| 3,438,606 | 4/1969 | Rubin | 248/415 |
| 3,570,800 | 3/1971 | Cycowicz | 248/415 |
| 3,742,870 | 7/1973 | Gusdorf | 248/415 |

FOREIGN PATENT DOCUMENTS

| 2376013 | 9/1978 | France | 248/505 |
|---|---|---|---|
| 11324 | of 1892 | United Kingdom | 108/157 |

*Primary Examiner*—J. Franklin Foss
*Assistant Examiner*—Robert A. Olson
*Attorney, Agent, or Firm*—McCaleb, Lucas & Brugman

[57] ABSTRACT

Collapsible support stand for an electronic musical keyboard and the like consisting of a floor-engageable base member, a vertical post upstanding from the base member, a table top for supporting an electronic keyboard, and a rotary bearing member between the post and table top enabling the latter to be swiveled in use. Tapered joints between the bearing and base members, and the post, enable the stand to be assembled by press bits, and disassembled, without tools. The disasembled post and base member are held by straps and hooks against the underside of the table top in a compact carrying mode for convenient transport between points of use.

7 Claims, 7 Drawing Figures

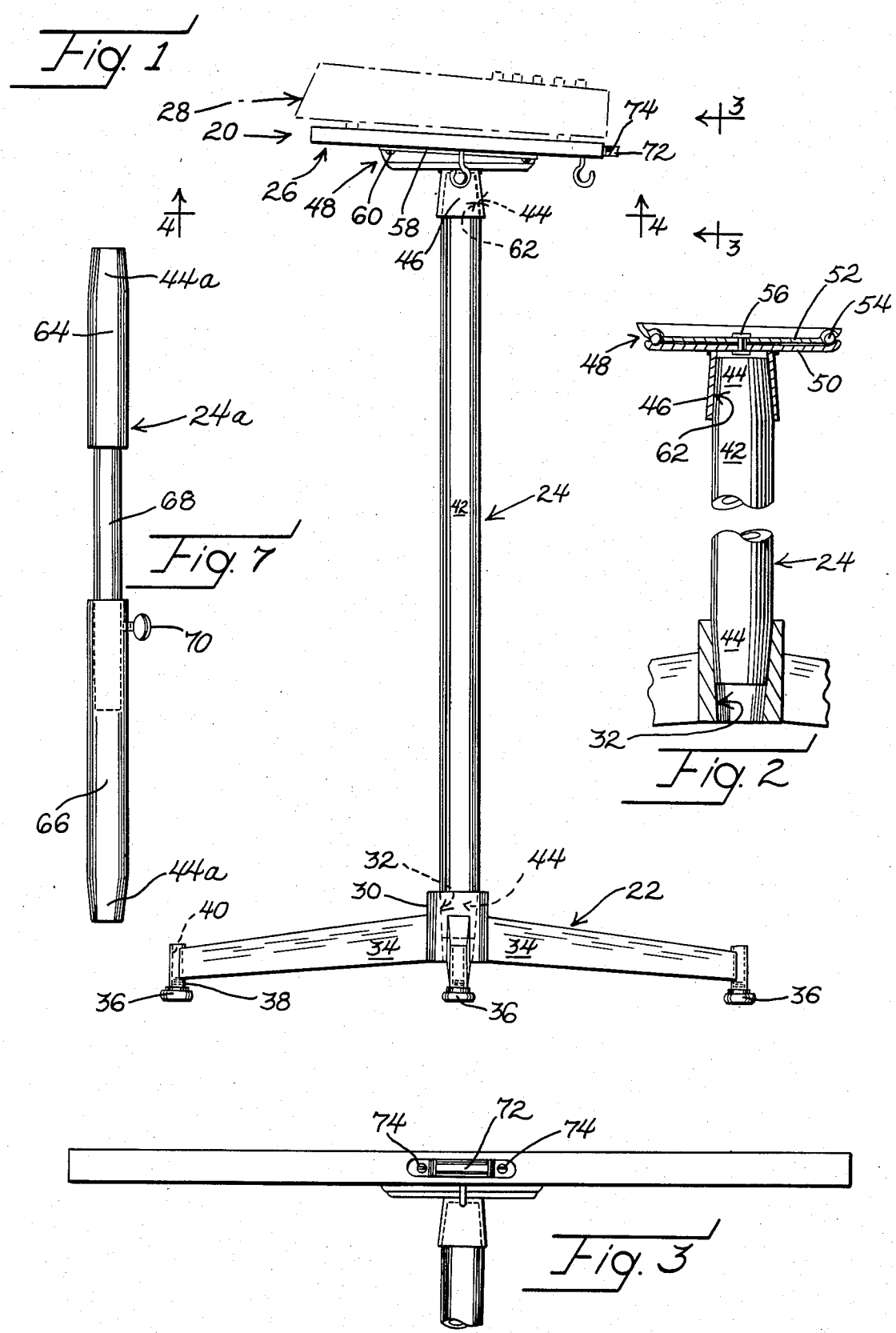

COLLAPSIBLE SUPPORT STAND FOR AN ELECTRONIC MUSICAL KEYBOARD AND THE LIKE

BACKGROUND OF THE INVENTION

A prior form of the present invention is described and shown in Disclosure Document No. 129830 dated Aug. 3, 1984, entitled "Swivel Support Stand for Electronic Keyboard and the Like".

Electronic organs, music synthesizers and the like are an important part of today's entertainment industry. Each has a keyboard which the musician plays, carrying it from job to job with his or her other music-making paraphernalia.

Before the present invention, electronic keyboards were supported on conventional tables, instrument cases, or other objects which were inconvenient to use and bulky to move. Some attempts have been made to provide keyboard stands which could be assembled and disassembled on the job but they have required special tools, they have been clumsy-looking and stationary and they have restricted players' mobility in directing attention selectively to the audience, the band or individual players in the band. This situation accordingly has been in need of improvement.

SUMMARY OF THE INVENTION

Therefore, a principal object of the present invention is to provide an electronic keyboard support stand with an easily swivelable table top to give the keyboard player mobility to move while playing, to turn 90° to scan the audience, turn 180° between the audience and the band, or simply to swivel the keyboard support from side to side in time with the music just for the fun of it.

Another object is to provide such a support stand which is easily and quickly assembleable and disassembleable without tools.

Another object is to provide in such a support stand a base, an upright post, and a table top, all of which can be separated and held together in a compact carrying mode by straps and attaching hooks on the underside of the table top.

Another object is to provide such a support stand which is readily adjustable in height, or can be easily tailor-made to meet a specific height requirement.

BRIEF DESCRIPTION OF THE DRAWINGS

Other objects and advantages will be apparent from the following description taken in connection with the accompanying drawings in which:

FIG. 1 is a side view of a support stand illustrating a preferred form of the present invention, with an electronic keyboard shown in phantom lines on the table top portion thereof, straps on the underside of the table top being omitted for clarity;

FIG. 2 is a fragmentary vertical cross-section of FIG. 1;

FIG. 3 is a fragmentary view of FIG. 1, from the player's position, as seen in the direction of arrows 3—3;

FIG. 7 is a modified form illustrating an alternate embodiment with an adjustable-height post.

Like parts are referred to by like reference characters throughout the figures of the drawings.

DETAILED DESCRIPTION OF THE PREFERRED EMBODIMENTS

Figure 4:
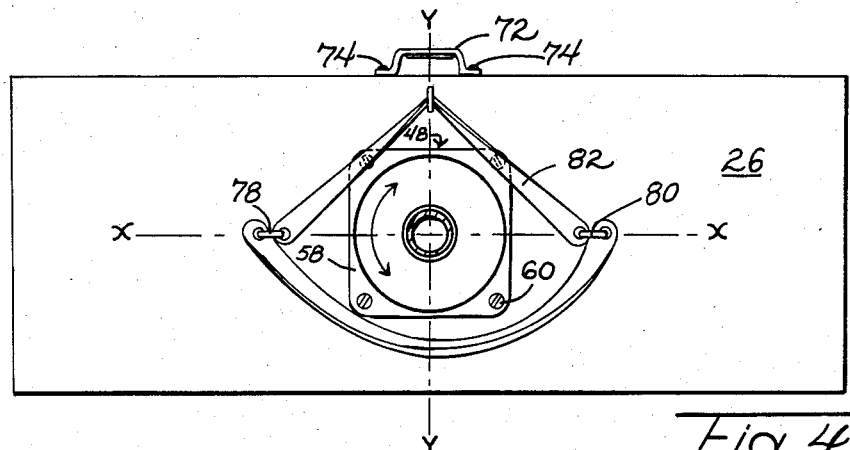
FIG. 4 is a bottom plan view of FIG. 1 taken along line 4—4.

Referring now to the specific embodiments of the invention, a preferred form of collapsible support stand is generally designated 20. It comprises a base member 22, a vertical post 24 upstanding from the base member, and a rectangular table top 26. FIG. 1 shows in phantom lines an example of an electronic keyboard 28 supported on the table top.

The base member 22 comprises a central hub 30 with an upwardly open conical recess 32. A plurality, in this case four, of radially extending horizontal legs 34 are fastened to the hub as by welding. Plastic leveling feet 36,36 are mounted on adjustment bolts 38 which are engaged with internal threads 40 at the ends of the legs. These plastic feet are rotated one way or the other to level and balance the stand when necessary to adjust for a non-level floor condition.

The post 24 shown in FIG. 1 is a simple, straight tube having a straight cylindrical center section 42 with tapered end sections 44 matching the taper of the hub recess 32 and the recess in the sleeve 46 to be described.

Rotatable bearing means 48 provides a connection between the upper end of the post 24 and the table top 26. As best shown in FIGS. 1 and 2, the bearing means comprises a lower race 50, an upper race 52 with balls or rollers 54 providing anti-friction means therebetween. A center rivet 56 holds the races together. The upper race has a square flange 58 fastened by screws 60 to the underside of the table top. As best shown in FIG. 1, the flange 58 is angularly disposed to provide a desirable, slight tilt to the table top.

The vertical sleeve 46 is connected as by welding 62 to the underside of lower race 50. It has a downwardly open recess 62 with a taper matching that of the tapered end sections 44 of the post.

In assembling the stand at a point of use, one end of the post is inserted into the recess 32 in the hub. It may then be turned upside down and the opposite end of the post tapped onto the floor to secure the lower connection. The table top, with the attached bearing member 48 will then be assembled by lowering the upper socket 62 onto the top tapered end section 44 of the post.

Because the tapered post ends and the upper and lower recesses match, this will provide a very stable, jiggle-free support for the keyboard 28. There are two ways of providing height adjustments. In FIG. 1, different length posts 42 may be made available to purchasers. If there is only one person using this stand there will be no need to make periodic height adjustments.

In case a stand is used by different people requiring different heights, an adjustable post may be provided as shown in FIG. 7. There, the post is designated 24a and consists of an upper tubular section 64 and a lower tubular section 66. A smaller diameter extension 68 is carried by the upper section and is telescopically, slidably adjustable into the lower section where it may be fixed at a selected height by means of a set screw 70. Opposite tapered ends 44a, 44a are identical to those designated 44,44.

A very important part of the invention is the means enabling the major components to be held together in a compact carrying mode by strap and attachment means which will now be described.

A handle 72 is affixed by screws 74 to one of the long edges of the table top 26. Three circular eye hooks are provided on the underside of the table top 26. These comprise one hook 76 adjacent to handle 72 on the vertical center line Y—Y shown in FIG. 4, and a pair of hooks 78,80 flanking the rotatable bearing assembly 48 on the longitudinal center line marked X—X. A first strap 82 has a generally V-configuration with its midsection attached to hook 76 and its apertured ends attached respectively to hooks 78 and 80. This strap is left assembled in this manner at all times, however it is not shown in FIG. 1 in the interest of clarity. In placing the stand in carrying mode, as shown in FIG. 5, the first strap 82 is lifted sufficiently to slide the post 24 under it as shown in FIG. 5.

Figure 5:
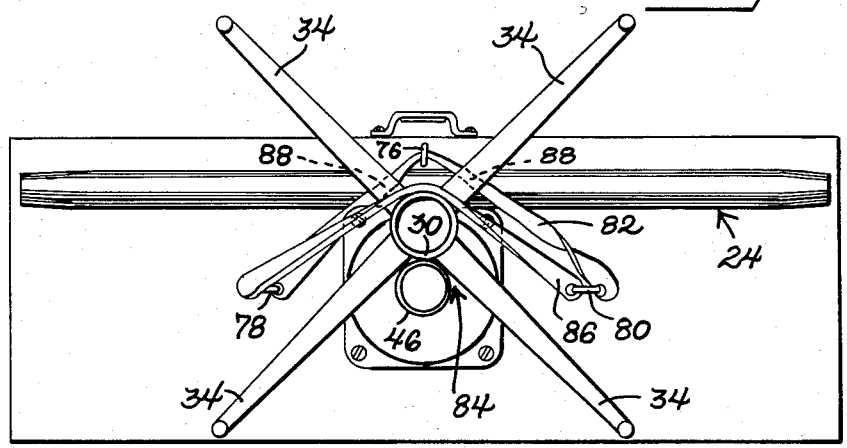
FIG. 5 is a view of the support stand disassembled and held in compact carrying mode.

The next step in placing the stand in carrying mode is fitting the base into the position shown in FIG. 5 where one of the spaces 84 between a pair of adjacent legs 34 receive the vertical sleeve 46. The hub 30 is parallel to the sleeve and abuts it edgewise. In this position, a second strap 86 is trained about the hub 30 (about the "top" surface shown in FIG. 5), and its ends are connected to hooks 78 and 80.

The straps 82 and 86 are preferably rubber-like in order to elastically hold the parts in the position shown in FIG. 5, and may be those known as "Bunge" straps available for holding luggage in place on vehicles and the like.

Another advantage of the particular strap and hook arrangement shown in FIG. 5 is that portions of strap 82 marked 88 are compressed between the post 24 and the overlying legs 34 to prevent rubbing and abrasive action between those parts when transported.

Figure 6:
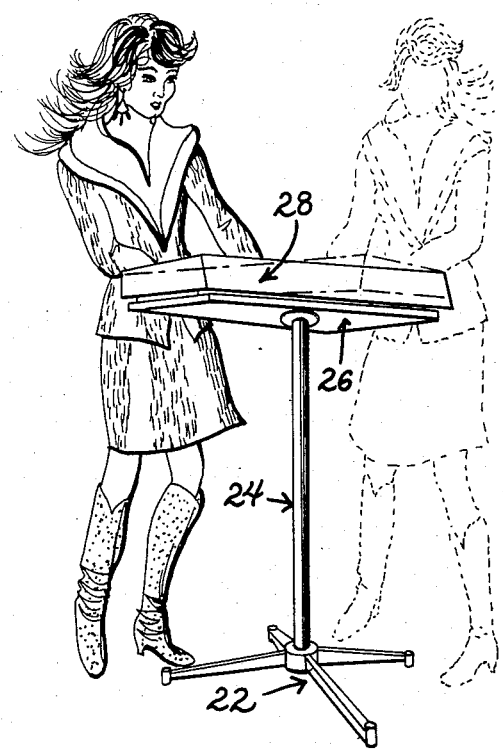
FIG. 6 is a perspective view illustrating a player's mobility with this invention.

FIG. 6 illustrates the extreme mobility of the keyboard operator in moving easily between the solid line and broken line positions shown, to scan the audience or alternately divide her attention between the audience and the band, or different members of the band.

The embodiments described and shown to illustrate the invention have been necessarily specific for purposes of illustration. Alterations, extensions and modifications will be apparent to those skilled in the art. The aim of the appended claims therefore is to cover all variations included within the spirit and scope of the invention.

The embodiments of the invention in which an exclusive property or privilege is claimed are defined as follows:

1. A collapsible support stand for an electronic musical keyboard and the like, said stand in a disassembled carrying mode comprising:
   (a) a base member, a post and a table top to be removably positioned on one end of said post and having a pair of parallel opposed sides for supporting an electronic keyboard on the upper surface thereof;
   (b) a vertical sleeve with a downwardly open recess centrally located on and extending from the undersurface of the table top for receiving said one end of said post;
   (c) said base member including a plurality of radially extending horizontal legs with transverse spaces between adjacent legs terminating in a centrally located hub extending upwardly therefrom, said hub having an open recess extending upwardly from said base member for receiving the other end of said post;
   (d) the ends of said post being adapted to be removably seated within said recesses in said sleeve and base member respectively;
   (e) strap securing means secured to the undersurface of said table top comprising three strap securing members positioned at the apices of a triangle, one apex of said triangle being adjacent said one of said opposed sides and positioned substantially along a first line through said sleeve which is normal to a second line through said sleeve, which second line is parallel to said pair of opposed sides of said table the other apices being on opposite sides of said sleeve along said second line;
   (f) a first strap secured to said strap securing members at said other apices and passing through said strap securing member at said one apex;
   (g) a second strap secured to said strap securing members at said other apices; and
   (h) said post is placed against the undersurface of the table top underneith said first strap, and said base is placed over said post against the undersurface of the table top with the sleeve extending into one of said spaces between the legs of the base, with said second strap securing said base to said table top.

2. The stand of claim 1 wherein said strap securing members are hooks.

3. The stand of claim 1 wherein said first strap is normally under tension.

4. The stand of claim 2 wherein said first strap is normally under tension.

5. The stand of claim 3 wherein said second strap is normally under tension.

6. The stand of claim 4 wherein said second strap is normally under tension.

7. The stand of claim 1 including a carrying handle secured to said one of said opposite sides of the top.

* * * * *

UNITED STATES PATENT AND TRADEMARK OFFICE
CERTIFICATE OF CORRECTION

PATENT NO. : 4,634,090

DATED : January 6, 1987

INVENTOR(S) : "COLLAPSIBLE SUPPORT STAND FOR AN ELECTRONIC MUSICAL KEYBOARD AND THE LIKE"

It is certified that error appears in the above—identified patent and that said Letters Patent is hereby corrected as shown below:

Column 2, at the end of line 39, "62" should be deleted;

Column 4, after Claim 7, the following claim should be added:

-- 8. The stand of claim 1 wherein said vertical sleeve is rotatable relative to the table top. --

Signed and Sealed this

Twenty-eighth Day of April, 1987

*Attest:*

DONALD J. QUIGG

*Attesting Officer*     *Commissioner of Patents and Trademarks*